US007258723B2

(12) United States Patent
Crawley et al.

(10) Patent No.: US 7,258,723 B2
(45) Date of Patent: Aug. 21, 2007

(54) PARTICULATE FILTER ASSEMBLY AND ASSOCIATED METHOD

(75) Inventors: Wilbur H. Crawley, Columbus, IN (US); Randall J. Johnson, Greenwood, IN (US); Stephen P. Goldschmidt, Westport, IN (US)

(73) Assignee: Arvin Technologies, Inc., Troy, MI (US)

( * ) Notice: Subject to any disclaimer, the term of this patent is extended or adjusted under 35 U.S.C. 154(b) by 232 days.

(21) Appl. No.: 10/951,064

(22) Filed: Sep. 27, 2004

(65) Prior Publication Data

US 2006/0065121 A1 Mar. 30, 2006

(51) Int. Cl.
*B01D 41/04* (2006.01)

(52) U.S. Cl. ...................... 95/5; 55/282.3; 55/DIG. 10; 60/275; 60/311; 95/6; 95/7; 95/20; 95/21; 95/68; 95/278; 96/20; 96/22; 96/24; 96/30; 96/425

(58) Field of Classification Search ............. 96/20–24, 96/30, 31, 80–83, 425; 95/5–7, 68, 19–21, 95/278, 283; 60/275, 311; 323/903; 55/282.3, 55/DIG. 10

See application file for complete search history.

(56) References Cited

U.S. PATENT DOCUMENTS 4,410,849 A * 10/1983 Ando ......................... 323/237
4,541,847 A 9/1985 Oie et al. ...................... 96/58
4,549,887 A 10/1985 Joannou ........................ 96/58
4,581,046 A 4/1986 Bergman ....................... 96/58
4,623,365 A 11/1986 Bergman ....................... 96/58
4,652,281 A 3/1987 Masuda et al. ................ 96/69
4,654,054 A 3/1987 Snaddon et al. ............... 96/68
4,662,903 A 5/1987 Yanagawa ...................... 96/59
4,759,778 A 7/1988 Conrad .......................... 96/59
4,828,586 A 5/1989 Joannou ........................ 96/66
4,871,495 A 10/1989 Helferich et al. ............. 264/43
4,871,515 A 10/1989 Reichle et al. .............. 422/174
4,898,105 A 2/1990 Rappoldt et al. ........... 110/245
4,954,320 A 9/1990 Birmingham et al. .. 422/186.04

(Continued)

FOREIGN PATENT DOCUMENTS

DE 3638203 A1 5/1988

(Continued)

OTHER PUBLICATIONS

Yamamoto et al., "Synthesis of Ultrafine Particles by Surface Discharge-Induced Plasma Chemical Process (SPCP) and its Application", *Applied Electrostatic Studies of Senichi Masuda*, pp. 184-188, (1992).

(Continued)

*Primary Examiner*—Richard L. Chiesa
(74) *Attorney, Agent, or Firm*—Barnes & Thornburg LLP

(57) ABSTRACT

A particulate filter assembly includes an electrode assembly, a particulate filter positioned in an electrode gap defined between two electrodes of the electrode assembly, a power supply electrically coupled to the electrode assembly, and a controller for controlling operation of the power supply to apply a regenerate-filter signal to the electrode assembly to oxidize particulates collected by the particulate filter. An associated method of regenerating the particulate filter is disclosed.

16 Claims, 6 Drawing Sheets

U.S. PATENT DOCUMENTS

| | | | | |
|---|---|---|---|---|
| 4,976,760 | A | 12/1990 | Helferich et al. | 55/487 |
| 5,009,683 | A | 4/1991 | Sun | 96/66 |
| 5,059,218 | A | 10/1991 | Pick | 96/66 |
| 5,108,470 | A | 4/1992 | Pick | 96/58 |
| RE34,549 | E | 2/1994 | Sun | 96/66 |
| 5,322,537 | A | 6/1994 | Nakamura et al. | 55/523 |
| 5,368,635 | A | 11/1994 | Yamamoto | 96/17 |
| 5,402,639 | A * | 4/1995 | Fleck | 60/275 |
| 5,557,923 | A * | 9/1996 | Bolt et al. | 60/274 |
| 5,573,577 | A | 11/1996 | Joannou | 96/66 |
| 5,582,632 | A | 12/1996 | Nohr et al. | 95/78 |
| 5,593,476 | A | 1/1997 | Coppom | 95/78 |
| 5,647,890 | A | 7/1997 | Yamamoto | 95/69 |
| 5,807,425 | A | 9/1998 | Gibbs | 96/66 |
| 5,855,653 | A | 1/1999 | Yamamoto | 96/58 |
| 5,906,677 | A | 5/1999 | Dudley | 96/17 |
| 6,077,334 | A | 6/2000 | Joannou | 96/66 |
| 6,231,643 | B1 | 5/2001 | Pasic et al. | 95/75 |
| 6,235,090 | B1 | 5/2001 | Bernstein et al. | 96/57 |
| 6,290,757 | B1 | 9/2001 | Lawless | 96/19 |
| 6,294,004 | B1 | 9/2001 | Summers et al. | 96/66 |
| 6,572,685 | B2 | 6/2003 | Dunshee | 96/59 |
| 6,680,037 | B1 | 1/2004 | Allansson et al. | 423/215.5 |
| 6,938,409 | B2 * | 9/2005 | Birckigt et al. | 60/275 |
| 7,081,152 | B2 * | 7/2006 | Altman et al. | 95/5 |
| 2002/0152890 | A1 | 10/2002 | Leiser | 95/63 |
| 2003/0037676 | A1 | 2/2003 | Dunshee | 96/59 |
| 2003/0079609 | A1 | 5/2003 | Lobiondo, Jr. | 96/59 |
| 2003/0079982 | A1 * | 5/2003 | Josephson et al. | 204/164 |
| 2003/0110944 | A1 | 6/2003 | Wu et al. | 95/63 |
| 2003/0164095 | A1 | 9/2003 | Joannou | 96/59 |
| 2003/0233824 | A1 | 12/2003 | Chun et al. | 60/275 |
| 2004/0079631 | A1 | 4/2004 | Birckigt et al. | 204/164 |

FOREIGN PATENT DOCUMENTS

| | | | |
|---|---|---|---|
| FR | 2812685 | A1 | 2/2002 |
| WO | WO 02/42615 | A1 * | 5/2002 |

OTHER PUBLICATIONS

Masuda et al., "Destruction of Gaseous Pollutants by Surface-Induced Plasma Chemical Process (SPCS)", *Applied Electrostatic Studies of Senichi Masuda*, pp. 196-201, (1993).

Oda et al., "Decomposition of Gaseous Organic Contaminants by Surface Discharge Induced Plasma Chemical Processing—SPCP", *Applied Electrostatic Studies of Senichi Masuda*, pp. 242-248, (1996).

European Search Report for European Application No. 05255989.5-2214, Jan. 4, 2006.

* cited by examiner

PARTICULATE FILTER ASSEMBLY AND ASSOCIATED METHOD

FIELD OF THE DISCLOSURE

The present disclosure relates to a particulate filter assembly and a method of regenerating a particulate filter thereof.

BACKGROUND OF THE DISCLOSURE

A particulate filter is used to collect particulates such as, for example, particulates that may be present in air, exhaust gas, and a wide variety of other media that may contain particulates. From time to time, the collected particulates may be removed from the particulate filter to thereby "regenerate" the filter for further filtering activity.

SUMMARY OF THE DISCLOSURE

According to an aspect of the present disclosure, a particulate filter assembly comprises an electrode assembly, a particulate filter positioned in an electrode gap defined between first and second electrodes of the electrode assembly, and a power supply electrically coupled to the electrode assembly. A controller is electrically coupled to the power supply and comprises a processor and a memory device electrically coupled to the processor.

The memory device has stored therein a plurality of instructions which, when executed by the processor, cause the processor to operate the power supply according to predetermined signal-application criteria to cause the power supply to intermittently apply a regenerate-filter signal to the electrode assembly so as to intermittently generate at least one of (1) an arc between the first and second electrodes to oxidize particulates collected by the particulate filter if generation of the arc is initiated as a result of reduction of electrical resistance in the electrode gap due to creation of an arc-conductive path by particulates collected by the particulate filter and (2) a corona discharge between the first and second electrodes to oxidize particulates collected by the particulate filter. An associated method of regenerating the particulate filter is disclosed.

DETAILED DESCRIPTION OF THE DRAWINGS

Figure 1:
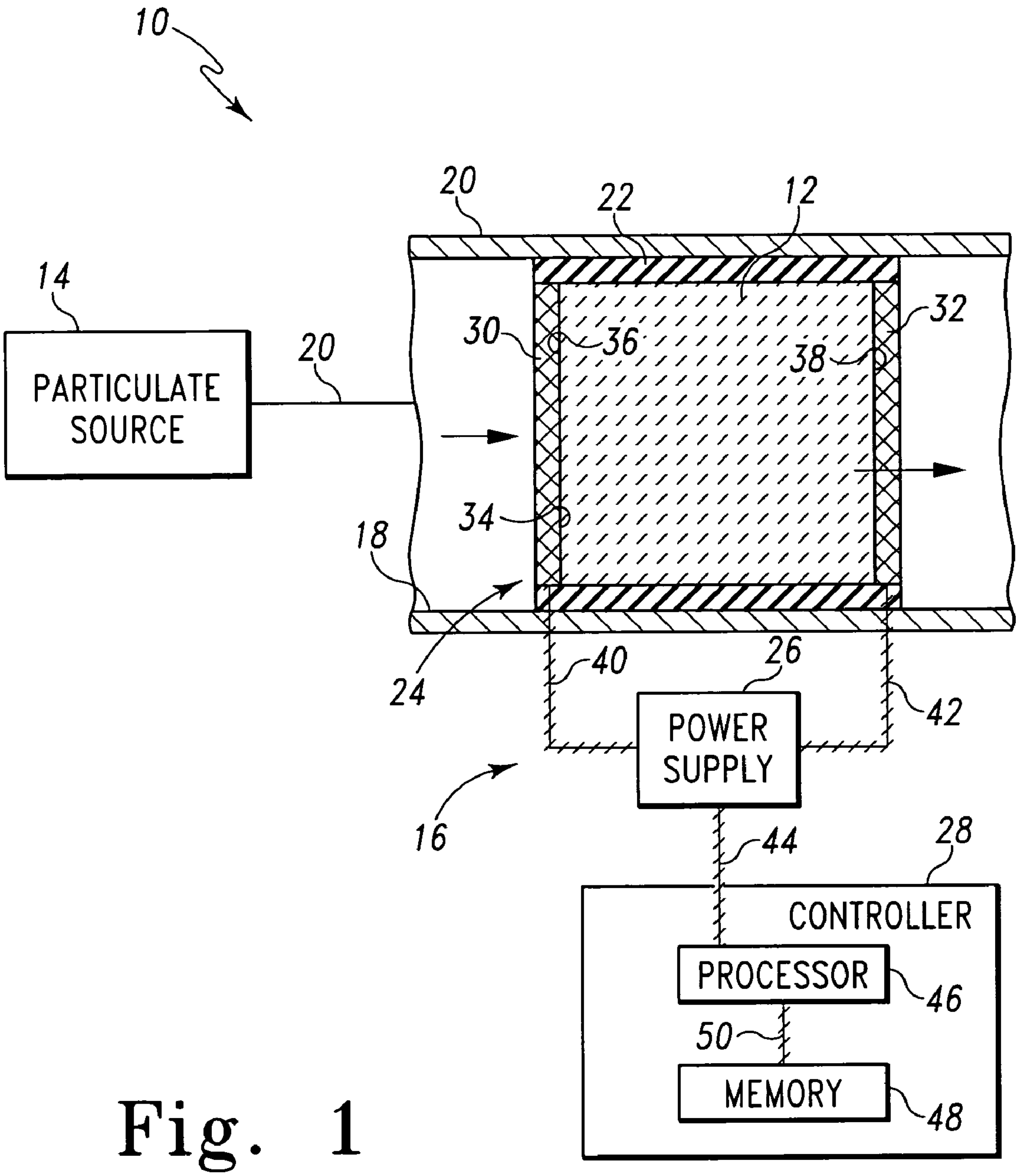
FIG. 1 is a sectional view showing a particulate filter positioned between a pair of electrodes of a filter regenerator configured to oxidize particulates collected by the particulate filter and thereby regenerate the particulate filter.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

A particulate filter assembly 10 comprises a particulate filter 12 for filtering particulates provided by a particulate source 14 and a filter regenerator 16 for regenerating the filter 12 by removing from the filter 12 particulates collected by the filter 12, as shown, for example, in FIG. 1. The filter 12 may be configured to filter air, exhaust gas, or a wide variety of other substances containing particulates. As such, the particulate source 14 may be a room or other air-containing space, an internal combustion engine or other exhaust gas producer, or a wide variety of other sources that generate, produce, discharge, or otherwise provide particulates.

The particulate filter 12 may be any type of commercially available particulate filter. For example, the particulate filter 12 may be embodied as any known exhaust particulate filter such as a "wall flow" filter or a "deep bed" filter. Wall flow filters may be embodied as a cordierite or silicon carbide ceramic filter with alternating channels plugged at the front and rear of the filter thereby forcing the gas advancing therethrough into one channel, through the walls, and out another channel. Deep bed filters, on the other hand, may be embodied as metallic mesh filters, metallic or ceramic foam filters, ceramic fiber mesh filters, and the like. Moreover, the particulate filter 12 may also be impregnated with a catalytic material such as, for example, a precious metal catalytic material. The filter 12 may be electrically non-conductive or may include electrically conductive material. Illustratively, the filter 12 is made of a ceramic.

The particulate filter 12 is mounted in a passageway 18 of a fluid conductor 20 which is fluidly coupled to the particulate source 14. A mount 22 is used to mount the filter 12 in the passageway 18. The mount 22 is configured, for example, as a sleeve surrounding the filter 12 and secured to the conductor 20.

The filter regenerator 16 comprises an electrode assembly 24, a power supply 26 for supplying power to the electrode assembly 24, and a controller 28 for controlling operation of the power supply 26.

The electrode assembly 24 comprises first and second electrodes 30, 32 which are spaced apart from one another to define an electrode gap 34 therebetween. The filter 12 is positioned in the electrode gap 34 between the electrodes 30, 32 so that the electrode 30 is positioned next to an inlet face 36 of the filter 12 and the electrode 32 is positioned next to an outlet face 38 of the filter 12. Electrodes 30, 32 are configured, for example, as wire screen electrodes to maximize surface area coverage of faces 36, 38.

The power supply 26 is electrically coupled to the electrode assembly 24 and the controller 28. The power supply 26 is electrically coupled to the first electrode 30 via a signal line 40, the second electrode 32 via a signal line 42, and the controller 28 via a signal line 44. A suitable power supply is disclosed in U.S. patent application Ser. No. 10/737,333 which was filed on Dec. 16, 2003 and is hereby incorporated by reference herein.

The controller 28 comprises a processor 46 and a memory device 48 electrically coupled to the processor 46 via a signal line 50. The memory device 48 has stored therein a plurality of instructions which, when executed by the processor 46, cause the processor 46 to operate the power supply 26 according to predetermined signal-application criteria to cause the power supply 26 to intermittently apply a regenerate-filter signal 52 to the electrode assembly 24. Such intermittent application of the regenerate-filter signal 52 to the electrode assembly is used to intermittently generate at least one of (1) an arc between the first and second electrodes 30, 32 to oxidize particulates collected by the particulate filter 12 if generation of the arc is initiated (or if initiation of generation of the arc is enabled) as a result of reduction of electrical resistance in the electrode gap 34 from an arc-prevention level to an arc-enabling level due to creation of an arc-conductive path by particulates collected by the particulate filter 12 and (2) a corona discharge between the first and second electrodes 30, 32 to oxidize particulates collected by the particulate filter 12.

Such intermittent application of the regenerate-filter signal 52 to the electrodes 30, 32 helps to avoid overheating of, and thus potential damage to, the filter 12. It also allows ions generated by the arc and/or the corona discharge to evacuate the electrode gap 34 to facilitate subsequent initiation of an arc in an area of filter 12 that needs regeneration.

The regenerate-filter signal 52 is an alternating current (AC) signal. It is within the scope of this disclosure for the regenerate-filter signal to be a direct current (DC) signal.

Figure 2:
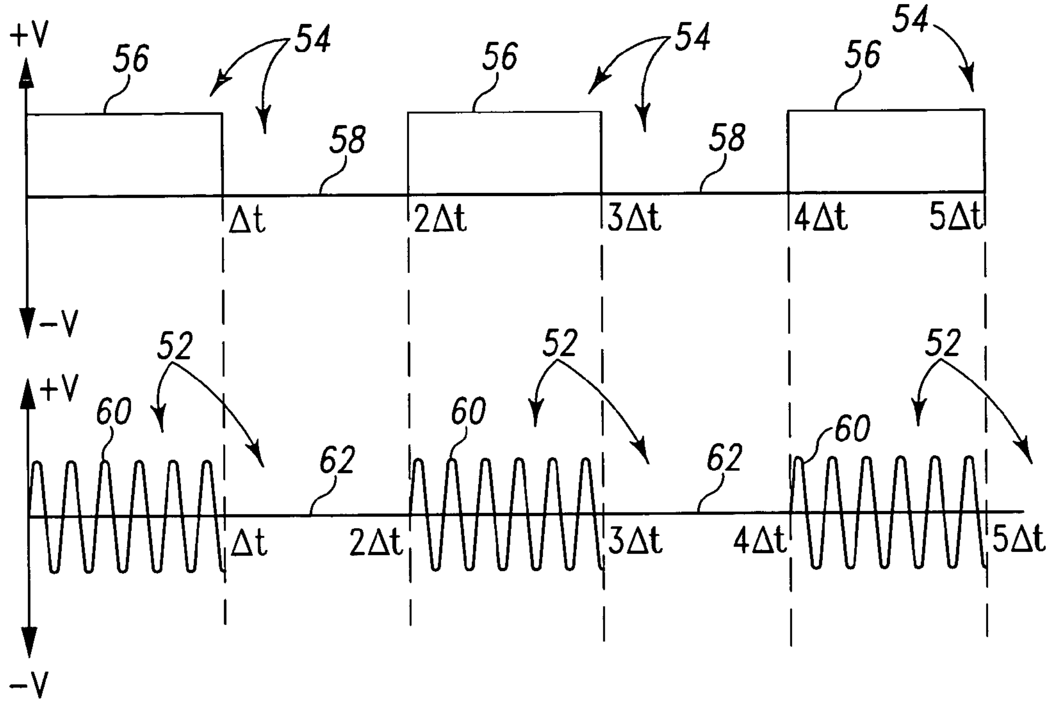
FIG. 2 is a diagrammatic view showing use of a control signal (on top) to control generation of a regenerate-filter signal (on bottom) and thus application of the regenerate-filter signal to the electrodes for regeneration of the particulate filter.

According to a first embodiment of the filter regenerator 16, the processor 46 cycles a control signal 54 between a first control state 56 and a second control state 58 to control cycling of the power supply 26 between an arc-generation mode and a signal non-generation mode, as shown, for example, in FIG. 2. In the first control state of the control signal 54, the processor 46 generates the control signal 54 on line 44 to cause the power supply 26 to assume the arc-generation mode in which the power supply 26 generates the regenerate-filter signal 52 and applies the regenerate-filter signal 52 to the first and second electrodes 30, 32 so as to generate an arc between the first and second electrodes 30, 32 to oxidize particulates collected by the particulate filter 12 if generation of the arc is initiated (or if generation of the arc is enabled) as a result of reduction of electrical resistance in the electrode gap 34 from the arc-prevention level to the arc-enabling level due to creation of an arc-conductive path by particulates collected by the particulate filter 12. As such, the power supply 26 causes the regenerate-filter signal 52 to assume an arc-generation state 60 in response to the first state 56 of the control signal 54.

In the second control state of the control signal 54, the processor 46 ceases generation of the control signal 54 on line 44 to cause the power supply 26 to assume the signal non-generation mode in which the power supply 26 ceases generation of the regenerate-filter signal 52 and thus ceases application of the regenerate-filter signal 52 to the first and second electrodes 30, 32. The regenerate-filter signal 52 thus assumes an off state 62 when the power supply 26 is in the signal non-generation mode. The filter 12 is allowed to cool somewhat during the signal non-generation mode to prevent overheating of the filter 12. Further, ions generated by the arc during the arc-generation mode of the power supply 26 are allowed to evacuate the electrode gap 34 during the signal non-generation mode of the power supply 26 to promote initiation of the arc in an area of the filter 12 that needs to be regenerated upon subsequent operation of the power supply 26 in the arc-generation mode.

Figure 3:
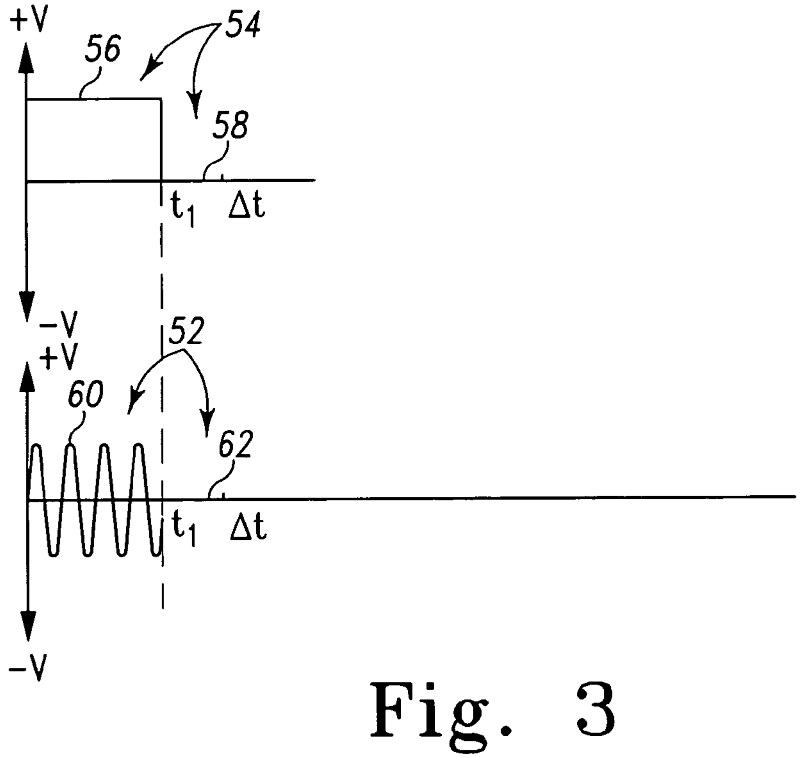
FIG. 3 is a diagrammatic view showing use of the control signal to cease generation of the regenerate-filter signal before expiration of a predetermined period of time in response to elevation of the average current applied to the electrodes to a predetermined current level.

The control signal 54 remains in the first control state for a predetermined period of time ($\Delta t$) before it changes to the second control state unless the electrical current applied to the electrodes 30, 32 by the regenerate-filter signal 52 reaches a predetermined current level, as shown, for example, in FIG. 3. If the processor 46 detects that the current has reached the predetermined current level, the processor 46 switches the control signal 54 to its second control state before expiration of the predetermined period of time (i.e., at some $t1<\Delta t$) to cause the power supply 26 to cease generation of the regenerate-filter signal 52 and thus application of the regenerate-filter signal 52 to the electrodes 30, 32 to prevent overheating of and potential damage to the filter 12.

The average power applied to the electrodes 30, 32 may be varied during application of the regenerate-filter signal 52 to the electrodes 30, 32. To do so, the average voltage and/or the average current applied to electrodes 30, 32 is increased or decreased.

Figure 4:
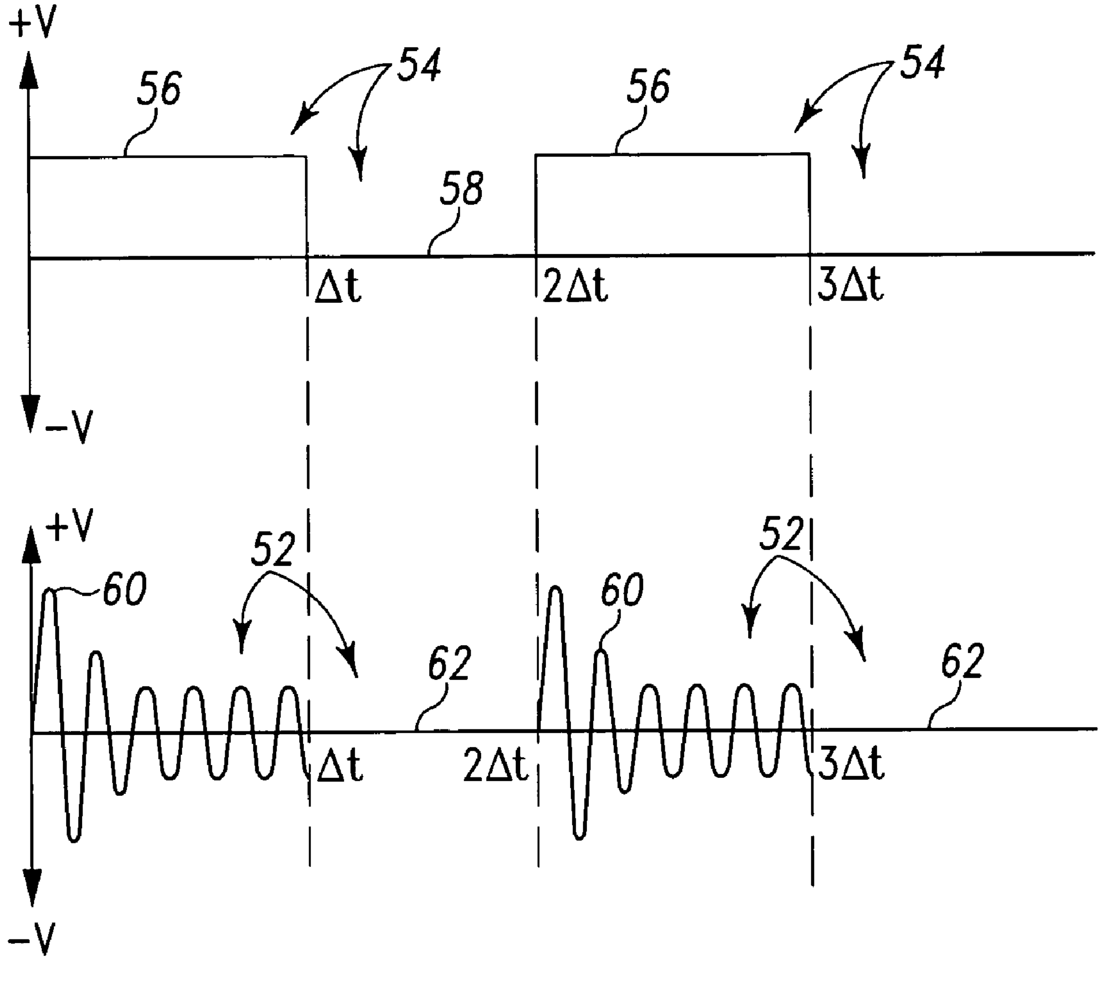
FIG. 4 is a diagrammatic view showing reduction of the average voltage of the regenerate-filter signal shortly after initiation of generation of an arc between the electrodes during each generation of the regenerate-filter signal.

With respect to voltage variation, exemplarily, the average voltage is decreased after initiation of an arc because the voltage needed to sustain an arc may be less than the voltage needed to initiate an arc due to creation of electrically conductive ions in the electrode gap 34 by the arc, as shown, for example, in FIG. 4. Initiation of the arc may be detected by an increase in the average current applied to electrodes 30, 32 or may be assumed to occur within a predetermined period of time after application of the signal 52 to the electrodes 30, 32.

With respect to current variation, exemplarily, the average current may increase and/or decrease in response to an arc encountering different levels of electrical resistance in the electrode gap 24. Such variation in the electrical resistance may be due to, for example, areas of filter 12 having collected different amounts of particulates.

Figure 5:
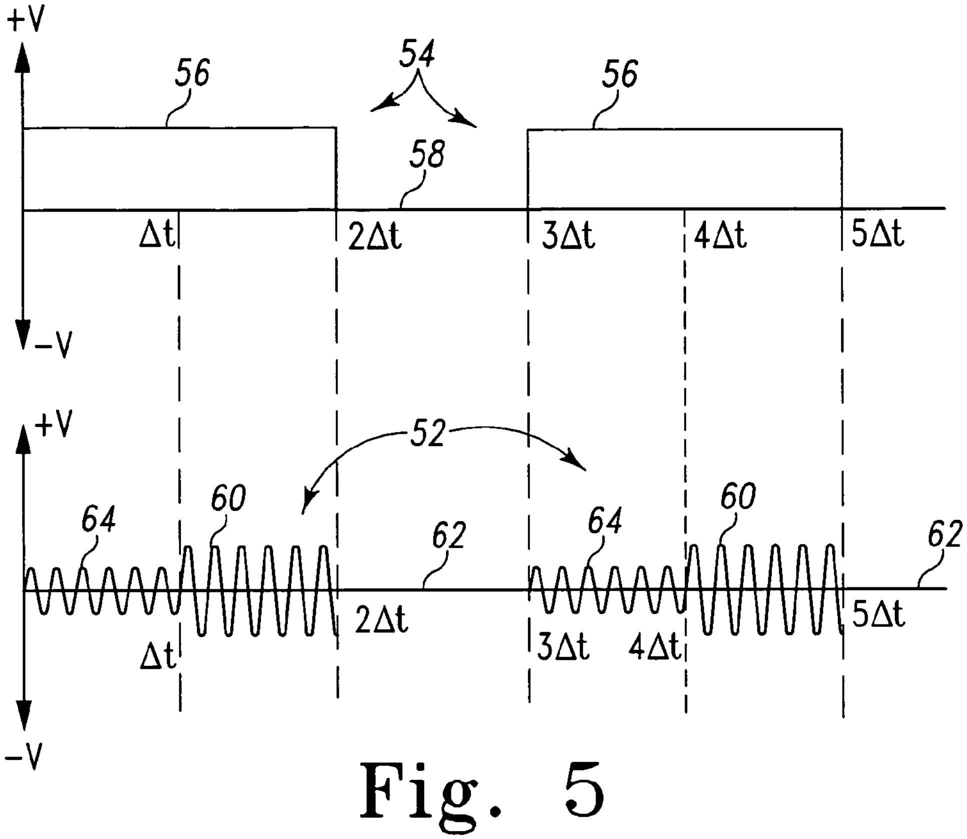
FIG. 5 is a diagrammatic view showing elevation of the average voltage of the regenerate-filter signal from a lower average voltage level for generating a corona discharge between the electrodes to a higher average voltage level for generating an arc between the electrodes during each generation of the regenerate-filter signal.

According to a second embodiment of the filter regenerator 16, the processor 46 cycles the control signal 54 between the first and second control states 56, 58 to control cycling of the power supply 26 between a corona-generation mode, the arc-generation mode, and the signal non-generation mode, as shown, for example, in FIG. 5. The corona-generation mode is initiated in response to initiation of the first control state 56 of the control signal 54. In the corona-generation mode, the power supply 26 generates the regenerate-filter signal 52 at a lower average voltage level so as to generate a corona discharge between the first and second electrodes 30, 32 without generation of an arc therebetween. The corona causes creation of ozone when oxygen is present. The ozone reacts with carbon in the particulates to thereby oxidize the particulates. The regenerate-filter signal 52 assumes a corona-generation state 64 when the power supply 26 is in the corona-discharge mode.

After operation of the power supply 26 in the corona-generation mode, the processor 46 causes the power supply 26 to assume the arc-generation mode by increasing the average voltage of the signal 52 from the lower average voltage level to a higher average voltage level. The higher average voltage level is higher than the lower average voltage level and sufficient to generate an arc when initiation of the arc is enabled as a result of reduction of electrical resistance in the electrode gap 34 from the arc-prevention level to the arc-enabling level due to creation of an arc-conductive path by particulates collected by the filter 12. As with the first embodiment of the filter regenerator 16, the signal 52 may be terminated upon expiration of a predetermined period of time or in response to a predetermined current level and the average power may be varied by increasing and/or decreasing the average voltage and/or average current applied to the electrodes 30, 32.

When the arc-generation mode is completed, the processor 46 causes the power supply 26 to assume the signal non-generation mode to cease generation of the signal 52 and application of the signal 52 to the electrodes 30, 32 to allow ions to evacuate the electrode gap 34.

Figure 6:
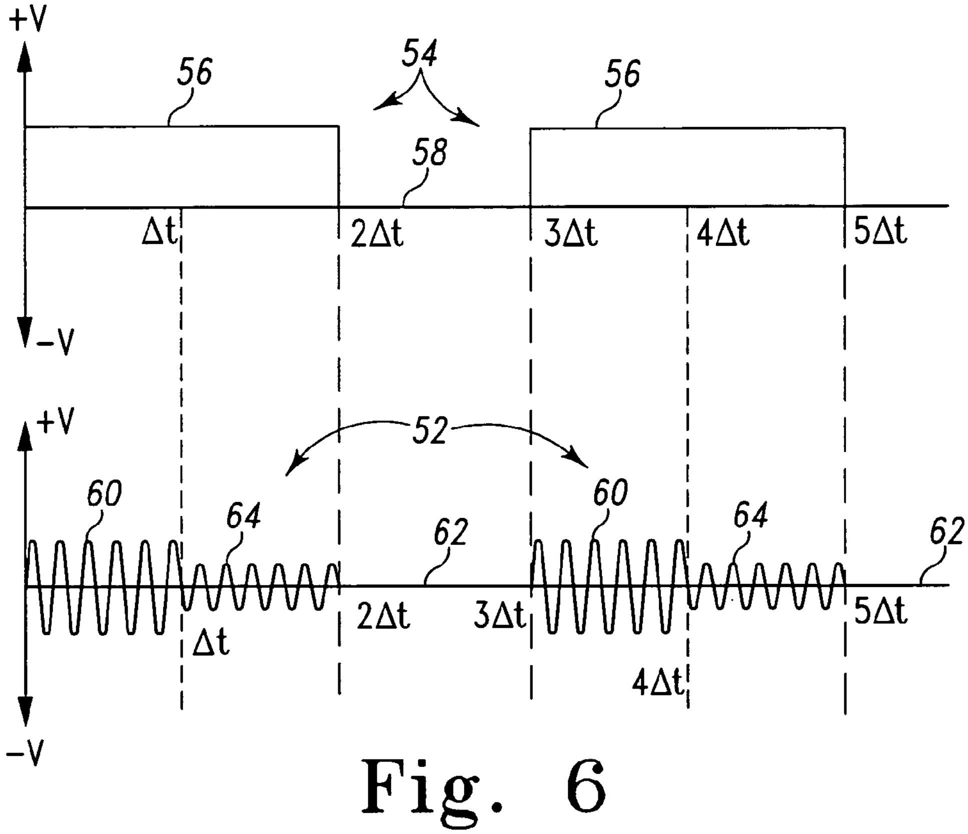
FIG. 6 is a diagrammatic view showing reduction of the average voltage of the regenerate-filter signal from the higher average voltage level for generating an arc to the lower average voltage level for generating the corona discharge during each generation of the regenerate-filter signal.

It is within the scope of this disclosure for the processor 46 to cause the power supply 26 to perform in a different mode order. For example, the processor 46 may cause the power supply 26 to assume the corona-generation mode immediately after the arc-generation mode so that the power supply 26 performs the arc-generation mode, then the corona-generation mode, and then the signal non-generation mode, as shown, for example, in FIG. 6.

Figure 7:
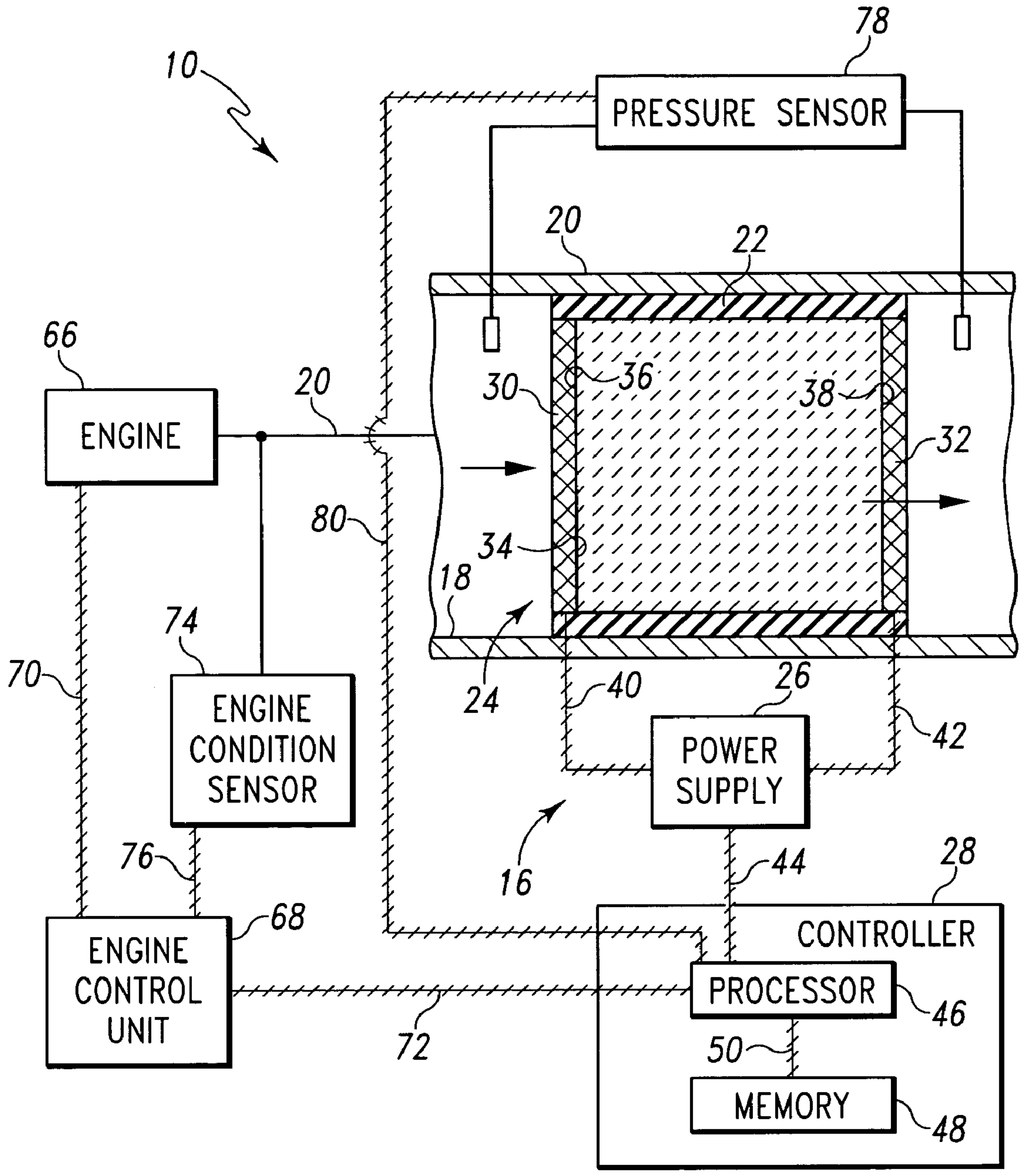
FIG. 7 is a sectional view showing use of the particulate filter and filter regenerator with an internal combustion engine.

In an implementation of the particulate filter assembly 10, the assembly 10 is used with an internal combustion engine 66 (e.g., a diesel engine) to filter exhaust gas discharged therefrom, as shown, for example, in FIG. 7. An engine control unit 68 (ECU) is electrically coupled to the engine 66 via a signal line 70 to control operation of the engine 66 and is electrically coupled to the processor 46 via a signal line 72 and an engine condition sensor 74 via a signal line 76. The sensor 74 is arranged to sense a condition of the engine 66 and to provide this engine condition information to ECU 68 over line 76. The processor 46 is configured to vary the duration of an occurrence of the first state 56 of the control signal 54 relative to a predetermined period of time in response to an engine condition signal sent from ECU 68 over line 72 to the processor 46 upon detection of a condition of engine 66 by sensor 74. The duration of an application of the regenerate-filter signal 52 is thereby varied in response to variation of the duration of the first state 56 of the control signal 54.

Figure 8:
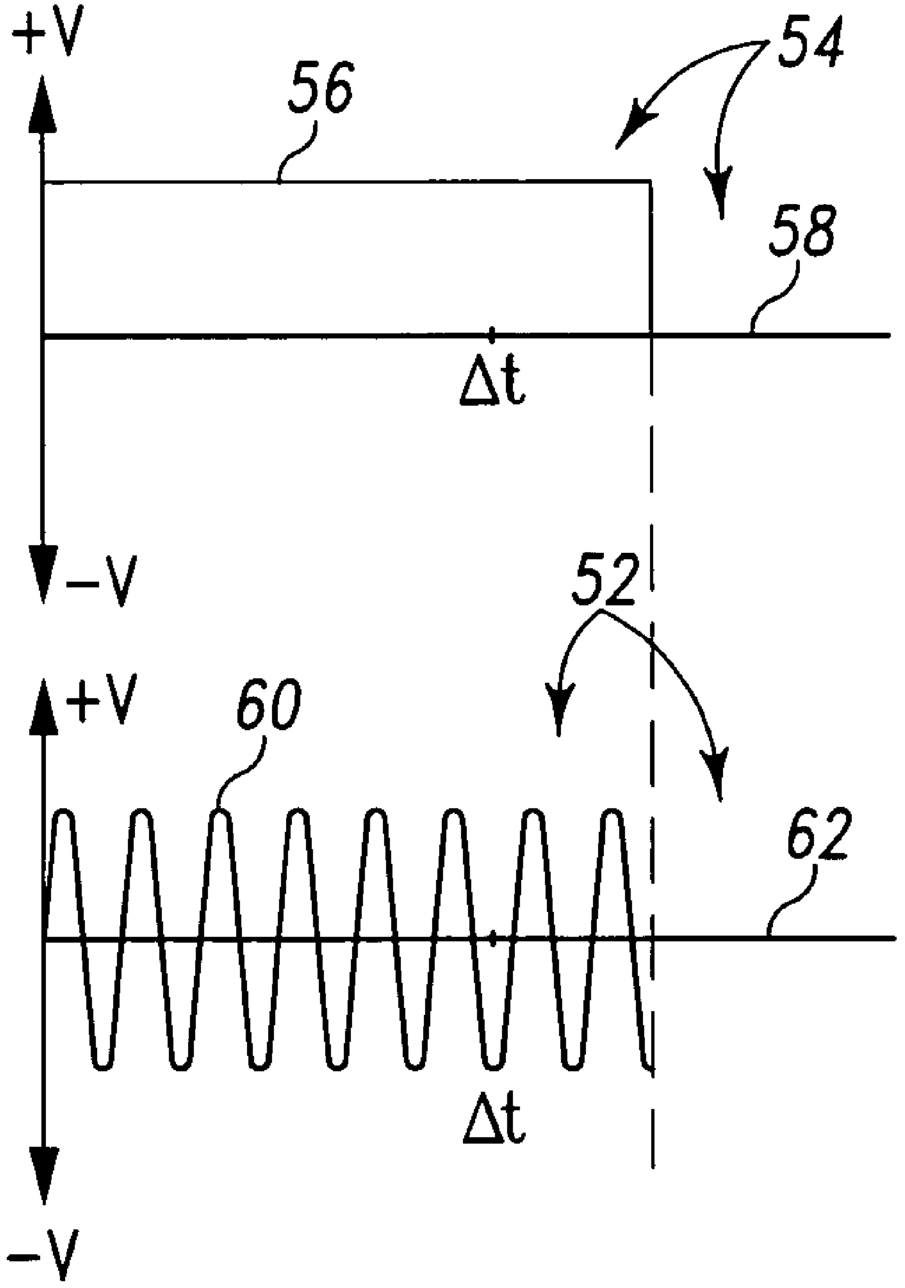
FIG. 8 is a diagrammatic view showing use of the control signal to prolong generation of the regenerate-filter signal beyond a predetermined period of time in response to detection of a condition of the engine shown in FIG. 7.

Exemplarily, the sensor 74 is a mass flow sensor coupled to conductor 20 between engine 66 and particulate filter assembly 10 to sense the mass flow rate of exhaust gas discharge from engine 66. In such a case, the processor 46 is configured to increase the duration of the first state 56 of the control signal 54 and thereby increase the duration of an application of the regenerate-filter signal 52 to the electrodes 30, 32 to exceed a predetermined period of time ($\alpha t$) in response to an increase in the mass flow rate of exhaust gas discharged from engine 66, as shown, for example, in FIG. 8. The processor 46 is further configured to decrease the duration of the first state 56 of the control signal 54 and thereby decrease the duration of an application of the regenerate-filter signal 52 to the electrodes 30, 32 to be less than the predetermined period of time ($\alpha t$) in response to a decrease in the mass flow rate of exhaust gas discharged from engine 66 in a manner similar to what is shown in FIG. 3.

Alternatively, exhaust mass flow may be calculated by the ECU 68 by use of engine operation parameters such as engine RPM, turbo boost pressure, and intake manifold temperature (along with other parameters such as engine displacement).

In some embodiments, controller 28 is configured to commence cycling of control signal 56 and thus cycling of power supply 26 and application of the regenerate-filter signal 52 to the electrodes 30, 32 in response to a triggering event. In one example, the controller 28 commences cycling in response to expiration of a predetermined shutdown period. In another example, the controller 28 commences cycling in response to a commence-cycling signal from ECU 68. In yet another example, the controller 28 commences cycling in response to receipt of a pressure signal representative of a predetermined pressure drop sensed across filter 12 by a pressure sensor 78 (FIG. 7) which sends the pressure signal to the processor 46 over a signal line 80.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A method of regenerating a particulate filter positioned in an electrode gap defined between spaced-apart first and second electrodes of an electrode assembly, the method comprising the step of intermittently applying a regenerate-filter signal to the electrode assembly according to predetermined signal-application criteria so as to intermittently generate both (1) an arc between the first and second electrodes to oxidize particulates collected by the particulate filter if generation of the arc is initiated as a result of reduction of electrical resistance in the electrode gap due to creation of an arc-conductive path by particulates collected by the particulate filter and (2) a corona discharge between the first and second electrodes to oxidize particulates collected by the particulate filter.

2. The method of claim 1, wherein the applying step comprises operating a power supply for a plurality of cycles between (i) an arc-generation mode generating the regenerate-filter signal at a higher average voltage level so as to generate an arc between the first and second electrodes if generation of the arc is initiated as a result of reduction of electrical resistance in the electrode gap due to creation of an arc-conductive path by particulates collected by the particulate filter and (ii) a corona-generation mode generating the regenerate-filter signal at a lower average voltage level lower than the higher average voltage level so as to generate a corona discharge between the first and second electrodes without generation of an arc therebetween.

3. The method of claim 2, wherein the applying step comprises operating the power supply in a signal non-generation mode ceasing generation of the regenerate-filter signal between operation of the power supply in the arc-generation mode and the corona-generation mode.

4. The method of claim 1, wherein the applying step comprises intermittently applying the regenerate-filter signal to the electrode assembly according to the predetermined signal-application criteria so as to intermittently generate an arc between the first and second electrodes to oxidize particulates collected by the particulate filter if generation of the arc is initiated as a result of reduction of electrical resistance in the electrode gap due to creation of an arc-conductive path by particulates collected by the particulate filter.

5. The method of claim 1, wherein the applying step comprises intermittently applying the regenerate-filter signal to the electrode assembly according to the predetermined signal-application criteria so as to intermittently generate a corona discharge between the first and second electrodes to oxidize particulates collected by the particulate filter.

6. The method of claim 1, wherein the applying step comprises varying the average power applied to the electrode assembly during application of the regenerate-filter signal to the electrode assembly.

7. The method of claim 6, wherein the power-varying step comprises varying the average voltage applied to the electrode assembly during application of the regenerate-filter signal to the electrode assembly.

8. The method of claim 6, wherein the power-varying step comprises varying the average current applied to the electrode assembly during application of the regenerate-filter signal to the electrode assembly.

9. The method of claim 1, wherein the applying step comprises applying the regenerate-filter signal to the electrode assembly for a predetermined period of time and ceasing application of the regenerate-filter signal to the electrode assembly in response to expiration of the predetermined period of time.

10. The method of claim 1, wherein the applying step comprises applying an electrical current to the electrode assembly and ceasing application of the regenerate-filter signal to the electrode assembly when the electrical current reaches a predetermined current level.

11. The method of claim 1, wherein the applying step comprises cycling a control signal for a plurality of cycles between a first control state causing generation of the regenerate-filter signal and a second control state ceasing generation of the regenerate-filter signal.

12. The method of claim 1, comprising detecting a condition of an internal combustion engine, wherein the applying step comprises varying the duration of an application of the regenerate-filter signal to the electrode assembly from a predetermined period of time in response to detection of the engine condition.

13. The method of claim 1, comprising ceasing performance of the applying step for a predetermined period of time and performing the applying step again in response to expiration of the predetermined period of time.

14. The method of claim 1, comprising detecting a predetermined pressure drop across the particulate filter and performing the applying step in response to detection of the predetermined pressure drop.

15. The method of claim 1, comprising generating an initiate-regeneration signal by use of an engine control unit and performing the applying step in response to the initiate-regeneration signal generated by the engine control unit.

16. A method of regenerating a particulate filter positioned in an electrode gap defined between spaced-apart first and second electrodes, the method comprising the steps of:

cycling a control signal for a plurality of cycles between a first control state and a second control state according to predetermined signal-application criteria, applying an AC regenerate-filter signal to the first and second electrodes in response to each occurrence of the first control state of the control signal so as to generate an arc between the first and second electrodes to oxidize particulates collected by the particulate filter if generation of the arc is initiated as a result of reduction of electrical resistance in the electrode gap due to creation of an arc-conductive path by particulates collected by the particulate filter, and ceasing application of the regenerate-filter signal to the first and second electrodes in response to each occurrence of the second control state of the control signal.

* * * * *